Jan. 7, 1930.  A. GODEL  1,742,247
PROCESS FOR THE SEPARATION OR RECOVERY OF
GASES AND VAPORS BY SOLID ADSORBENTS
Filed June 23, 1926  2 Sheets-Sheet 1

Inventor:—
Albert Godel,
By:—
Smith and Michael,
Attorneys.

Patented Jan. 7, 1930

1,742,247

UNITED STATES PATENT OFFICE

ALBERT GODEL, OF LAGNIEU, FRANCE, ASSIGNOR TO SOCIÉTÉ DE RECHERCHES ET D'EXPLOITATIONS PETROLIFERES, OF PARIS, FRANCE, A FRENCH SOCIÉTÉ ANONYME

PROCESS FOR THE SEPARATION OR RECOVERY OF GASES AND VAPORS BY SOLID ADSORBENTS

Application filed June 23, 1926, Serial No. 118,006, and in Great Britain May 28, 1926.

In the known processes usually employed for the separation or recovery of gases and vapors by solid adsorbents, such as activated carbon, silica gel, and the like, advantage is taken of the selective adsorbent power of the said solids in order to extract and retain certain gases or vapors mixed with other gases, the adsorption having to take place in definite conditions of pressure and temperature.
The solid serving as adsorbent is for this purpose arranged in any suitable vessel, stationary or movable, traversed by the gas to be treated; the adsorbent can be introduced into and extracted from the vessel in a continuous manner or it may be introduced and left therein without extraction, the said vessel being currently designated adsorber or adsorption filter.

If the nature of the adsorbent and the conditions of pressure and temperature have been suitably selected for an efficient adsorption of the product to be recovered, there will be a progressive saturation of this substance in proportion as the gas circulates in the adsorber. The passage of the gas can be arrested, by isolating the adsorber from the circuit, when the saturation of the adsorbent is considered sufficient.

It is then merely a question of separating or recovering from the adsorbent the product adsorbed thereby, this operation likewise rendering the adsorbent fit for a further adsorption; this operation is currently designated the recuperation, reactivation or regeneration stage in opposition to the period of adsorption which has preceded it. The recuperation is effected by an injection of steam or water vapor, generally superheated, into the adsorbent mass.
Having regard to the known development of these operations, the present invention has for its main object to effect a large economy of steam in the operation of recuperation or regeneration of the adsorbent.
In the processes known hitherto, the expenditure of steam has been considerable. It can be reduced by one half or more by a better utilization of the available heat units, according to the improved process hereafter described.

Figure 1:
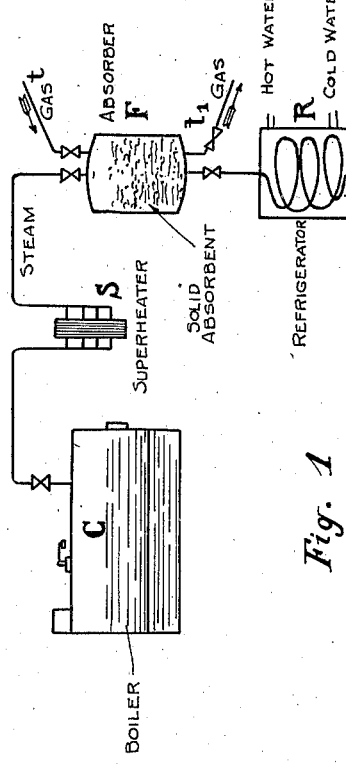

For a more complete comprehension of the advantages of the invention, there are represented diagrammatically and by way of examples on the accompanying drawings:

Figure 1, an installation currently employed for the recuperation of volatile solvents or hydrocarbons by solid adsorbents, for example, by activated carbon.

Figure 2:
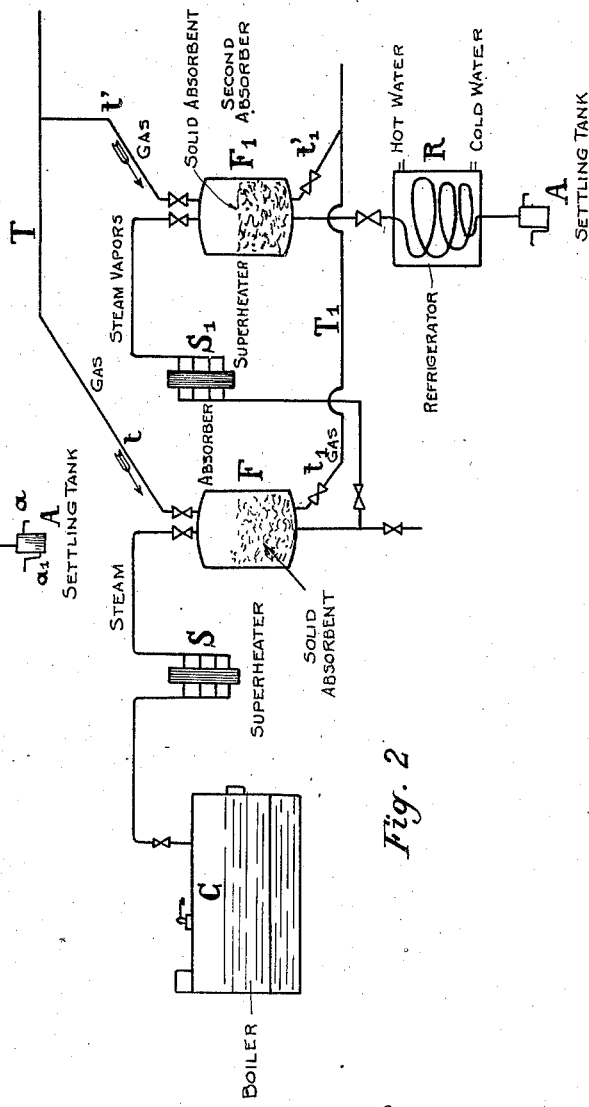

Figure 2, an installation having the same object, arranged in accordance with the present invention, with direct superheating of the steam derived from a first adsorber before its passage into a second adsorber.

Figure 3:
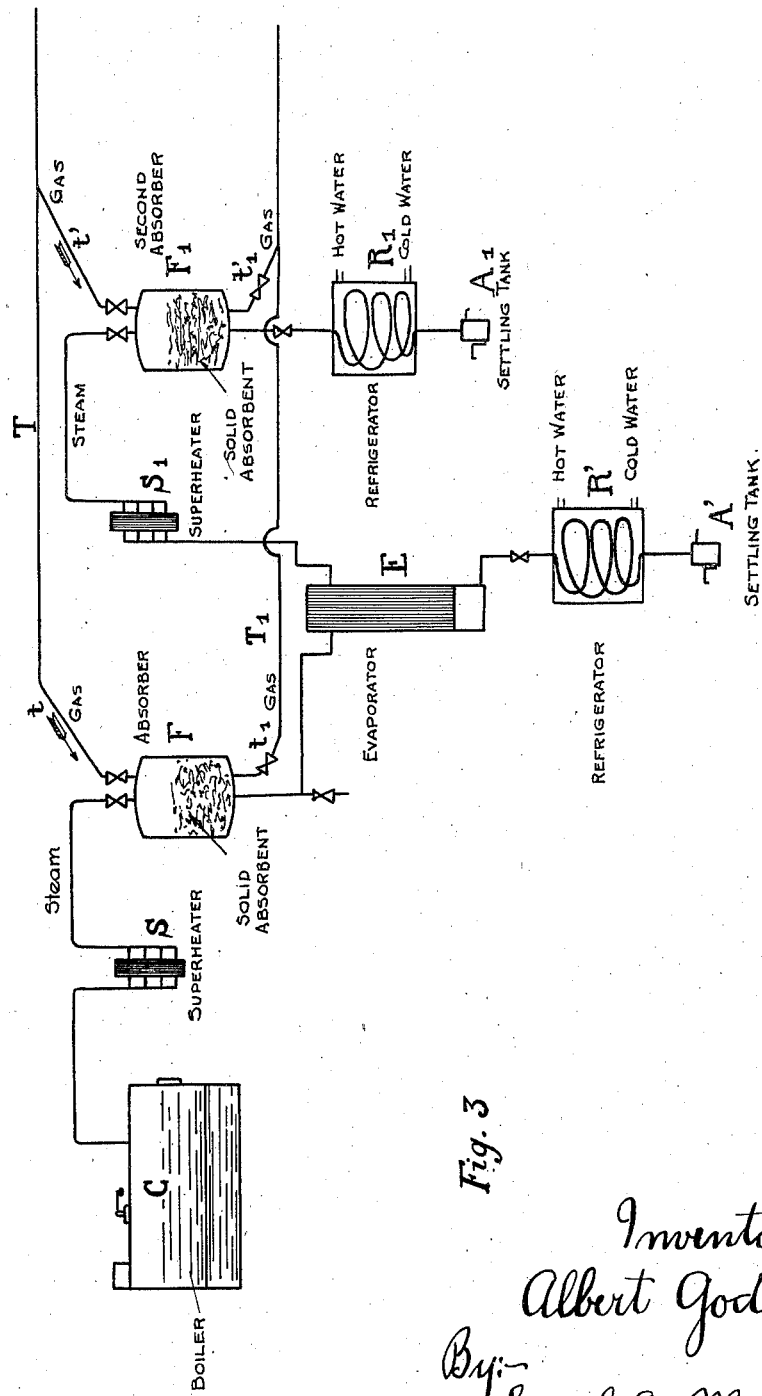

Figure 3, a modified installation, also arranged in accordance with the present invention.

In the usual process, as indicated in Figure 1, the steam produced by the boiler C is led by any suitable pipe system to the superheater S, and then passes to the filter F, filled with adsorbent material, in which the gas to be treated has previously circulated during the adsorption period. This gas enters the filter by the pipe $t$, traverses the adsorbent material, and then escapes by the pipe $t_1$ after having given up the products to be recovered (benzol, gasoline, etc.). The said pipes $t$ $t_1$ are closed as soon as the adsorbent mass is sufficiently saturated.

Dry steam is then admitted into the filter F and in circulating therein this steam displaces the adsorbed products from the adsorbent material, carrying them over to the refrigerator R. The condensation water, as well as the products carried over and condensed which are not miscible with water, will separate out by density in the florentine or settling tank A; the product recovered is collected at the outlet $a$ while the water escapes from the lower level at the point $a_1$. In case the product recovered is miscible or partly miscible with water, it may perhaps be necessary to effect a distillation of the condensate, because separation by density will not be sufficient.

Numerous improvements in this process are known having for their object to effect a certain economy of steam; in particular it has been found advantageous, before proceeding to inject steam into the adsorber, to heat the adsorbent mass to a temperature exceeding 100° C. by suitable means such as internal heating coils. This method avoids the condensation of too large a quantity of steam in the adsorbent mass, which would have the disadvantage of necessitating considerable expenditure of dry steam for its subsequent evaporation.

It is nevertheless impossible by that improved method as by all those hitherto brought into operation, to prevent the condensation of a large quantity of water in the adsorbent mass.

Further, according to the degree of superheat of the steam employed, in order to evaporate the water condensed in the adsorbent, there will be required a varying quantity of steam, possibly amounting to ten times more than the water to be evaporated from the adsorbent mass. It will be understood in these conditions that the consumption of steam is very high.

Moreover, a large quantity of steam is always indispensable for the complete purification of the adsorbent and for carrying over the body recovered. The heat units of the steam leaving the filter are, generally speaking, lost as pure waste in the cooling coils of the refrigerator.

The present invention allows, not only of diminishing the consumption of steam employed for regenerating each adsorber taken separately, but also of recovering the latent condensation heat of this steam, this heat recovery or recuperation being effected with a view to the economical and simultaneous treatment of a fresh adsorbent mass.

Now, the latent heat of steam is much greater than the superheat alone, as actually employed in the prior processes. It results therefore on balance that there is a considerable saving of steam due to the fact that the condensation heat units are recuperated by the method of the present invention.

One method of carrying out the invention consists in providing two adsorption filters $F$ $F_1$ (see Figure 2), mounted in series as regards their steam connections. In the first first place, the gaseous mixture to be treated is led into these filters by pipes $t$ $t'$ respectively, these being connected to the main pipe $T$; the mixture circulates therein until the adsorbent mass is sufficiently saturated with the product to be recovered, and then after having yielded up the product the gas leaves by the pipes $t_1$ $t_1'$, which are likewise connected to a main pipe $T_1$. As soon as the adsorbent mass is saturated, the pipes $t$ $t_1$ and $t$ $t_1'$ are shut off.

The arrangement represented in Figure 2 allows the circulation of the gas through the two adsorbers in parallel. There might be provided other arrangements of gas pipes allowing the circulation of the gas through the two adsorbers in series or again either method of circulation as desired.

After the circulation of the gases through the adsorption filters $F$ $F_1$, the steam derived from the boiler $C$ and superheated at $S$ is passed into the filter $F$. At the start of the operation, the steam condenses, heating the filter $F$ and the adsorbent mass. The steam then displaces the product to be recovered from the adsorbent mass and at the same time progressively dries this adsorbent mass to the extent of the available superheat.

The steam leaving the filter $F$ is therefore charged with the product recovered; it is in the state of saturated or wet steam, having given up its superheat. A part of the water may even escape in the condensed state and it will therefore be well to provide a steam trap or drain cock at the exit from the first adsorber.

According to the invention, the steam leaving the filter $F$ is utilized directly, after a second superheat applied by a superheater $S_1$, for the regeneration of a second filter $F_1$. In this way the whole of the latent or condensation heat of the steam is utilized, obviating the use of an equal quantity of steam for the treatment of the said filter $F_1$.

The steam, again enriched with the product to be recovered, is condensed together with this product in a refrigerator $R$, the separation of the liquids being effected by a florentine or settling tank $A$ or by any other means. After the passage of a sufficient quantity of superheated steam through the filters $F$ and $F_1$, the adsorbent material will have been restored or reactivated, dried and freed from any adsorbed product; it is therefore ready for a fresh adsorption operation. This adsorption may be carried out directly or after re-cooling of the adsorbent mass, the whole being effected by well known means.

It is evident that the back pressures or losses of head in the two filters $F$ $F_1$ and in the superheater $S_1$, are cumulative, leading to a certain excess of pressure in the filter $F$, but experiment has shown that no inconvenience results therefrom.

The same however does not apply in certain cases for the use of a superheater interposed between the two filters $F$ $F_1$, which may present the disadvantage of producing the cracking of certain recovered products carried over with the steam; a method of obviating such cracking is explained hereafter.

In order to avoid the above-mentioned cracking, the operation may be carried out under vacuum, which reduces the temperature of superheat necessary for the treatment of the filters. The operation may likewise be carried out according to a different general arrangement, represented in Figure 3.

In this modified arrangement, an evaporator E is interposed between the filter F and the superheater $S_1$; the remainder of the installation is arranged as in the previous case.

The steam leaving the first filter, being charged with the product to be recovered so that it cannot be employed directly after superheating is utilized to produce the evaporation of a substantially equal quantity of pure water, the exchange being effected in an evaporator of any suitable type; in most cases this will be a decreasing-pressure evaporator, but there may be used for example an evaporator with steam-compression or an evaporator operating by release of liquid.

Figure 3 applies especially to the case in which there is utilized an evaporator of the decreasing-pressure type.

At leaving the first filter F the steam charged with the product to be recovered passes to the evaporator E in which it condenses wholly or in part, or again equally with the product to be recovered. The water of condensation may be discharged from the base of the evaporator and evacuated directly or again it may be passed together with the uncondensed vapors into a refrigerator R' as represented in Figure 3. The pure water vapor or steam generated by the evaporator E is directed into the superheater $S_1$ before passing into the second filter $F_1$ in communication with another refrigerator $R_1$ and a florentine or settling tank $A_1$.

The refrigerator R' is likewise followed by a florentine tank A' for the decantation of the distillate.

The supply of water to the evaporator may in certain cases be effected with advantage by means of decanted hot water drawn off from the high pressure compartment of the evaporation tank.

According to the arrangement shown in Figure 3, and by the use of an evaporator of the decreasing-pressure type, as for an evaporator operating by release of liquid, there will necessarily exist a considerable fall of steam pressure, resulting in certain cases in a fairly high pressure in the first adsorber, this pressure amounting for example to as much as one or even two kilogrammes per square centimetre (gauge pressure). This back pressure does not present any disadvantage as regards satisfactory operation, as will be explained further on.

In certain cases, if it were found desirable, the two adsorbers F $F_1$ of Figures 2 or 3 might be grouped in a single metal casing, the general idea of the invention remaining unaffected.

If a steam-compression evaporator were employed, the secondary steam derived from the evaporator might without going beyond the scope of the invention be introduced into the circuit of the primary steam serving for the treatment of the first filter F; in that case the filter $F_1$ might be suppressed.

For this purpose the steam generated in the evaporator would have to be compressed to a pressure allowing it to re-enter the circuit of the primary steam in advance of the first superheater.

This compression might with advantage be produced by an injector of the Koerting type, utilizing the primary steam on its way to the superheater S; this injection steam would then have to be generated by the boiler C at a sufficient pressure for example 7 to 8 kilogrammes per square centimetre.

Lastly the use of an evaporator operating by release of liquid is particularly suitable if condensation water from the high pressure compartment of the evaporation tank can be used for the circulation with release; this will be possible when the product to be recovered is not miscible with water and can be separated readily therefrom by decantation in the evaporator itself. Moreover the rate of working and the temperature of the evaporator can be regulated so that there shall be no condensation of the volatile product distilled, which avoids any decantation of the said product. The volatile product will then have to be condensed separately outside the evaporator.

Certain arrangements are known in which a part of the latent or condensation heat of the steam leaving a filter is recovered, for example by an extraction of hot water from the top of the condensation coils or the like, but none of these arrangements allows of recovering any considerable quantity of the heat units lost in the condensation nor do they in any case allow simultaneous treatment with steam of two adsorbers or the like.

In particular the well known principles of multiple-effect evaporation have never been applied advantageously for the regeneration of solid adsorbents. Now, it has been shown that such regeneration is possible and that the main disadvantage resulting from the excess or back pressure to be maintained in the first filter can easily be surmounted for the following reasons:—An effective pressure, of some atmospheres for example, does not prevent at all or to any appreciable extent the evolution of the volatile products contained in the adsorbent when it is treated with superheated steam at this pressure. The adsorbent can be perfectly regenerated and dried by superheated steam under pressure, on condition of regulating the temperature of the superheat as a function of the pressure in question; in practice it will be sufficient to utilize in all cases steam possessing an equivalent superheat, whatever be the pressure adopted; for example there may be adopted a uniform superheat of 50°, 100°, 200° etc. of the steam at varying pressure, the superheat depending essentially only on the nature of the volatile body adsorbed.

The same arrangements can be applied in the case where the adsorbent is treated with saturated steam; it will suffice to suppress the superheaters altogether. It will be necessary in that case to provide means for drying the adsorbent, since such drying cannot be effected by saturated steam.

According to the invention it is possible to provide likewise more than one stage of recuperation of the steam utilized and thus to regenerate simultaneously more than two filters containing adsorbent substances. It will suffice for this purpose to arrange in sequence several apparatus such as described with regard to Figures 2 or 3. In this respect the only limitations will be as regards the complication of the apparatus and the excessive counter pressure caused in the earlier adsorbers.

To a certain extent the second drawback can be remedied by arranging after the refrigerator of the last adsorber, a suction pump or any other apparatus adapted to fulfill the same function. Treatment under vacuum may likewise be advantageous in the case in which only two adsorbers are employed.

For example in the installation represented in Figure 2, the two filters F and $F_1$ may be worked under vacuum simultaneously by the addition of a suction pump after the refrigerator R. This arrangement will have the advantages of allowing satisfactory operation at a fairly low temperature of superheated steam, and of allowing for example the replacement of ordinary superheaters heated by direct flame by simple tubular exchangers heated by high pressure steam.

For the arrangement of Figure 3, the vacuum apparatus may be placed at the exit from the second refrigerator $R_1$, which would allow of effecting the evaporation under vacuum in the evaporator E; the calorific efficiency of the evaporator would be considerably increased thereby. Moreover, the counter pressure in advance of the evaporator, that is to say in the filter F, would be reduced or even suppressed completely.

In all cases the vacuum pump may be duplicated by means for the extraction of condensation liquid.

The present invention can be applied simultaneously in combination with any other accessory arrangement tending likewise to produce an economy of steam consumption.

What I claim is:—

1. In a process for the recovery of volatile products by solid adsorbents with regeneration by steam, the improvement consisting in utilizing the steam leaving an adsorber for heating an evaporator, and superheating the secondary steam produced in said evaporator in order to serve for the regeneration of an adsorbent mass.

2. In a process for the recovery of volatile products by solid adsorbents with regeneration by steam, the improvement consisting in using an evaporator for condensing the steam leaving an adsorber, and superheating the secondary steam produced in said evaporator in order to serve for the regeneration of an adsorbent mass.

3. In a process for the recovery of volatile products by solid adsorbents with regenration by steam, the improvement consisting in using an evaporator for condensing the steam leaving an adsorber, and compressing the secondary steam produced in said evaporator in order to allow of its re-introduction into the primary steam circuit at an earlier point.

4. In a process for the recovery of volatile products by solid adsorbents with regeneration by steam, the improvement consisting in recuperating the latent heat of the steam leaving an adsorber, and utilizing said latent heat in the regeneration of another adsorber, said adsorbers being connected in series during the regeneration.

5. In a process for the recovery of volatile products by solid adsorbents with regeneration by steam, the improvement consisting in recuperating the latent heat of the steam leaving an adsorber, utilizing said latent heat in the regeneration of another adsorber, and applying suction to the latter adsorber.

6. In a process for the recovery of volatile products by solid adsorbents with regeneration by steam, the improvement consisting in recuperating the latent heat of the steam leaving an adsorber, utilizing said latent heat in the regeneration of another adsorber working at a lower pressure than said adsorber first mentioned, and adding the balance of heat necessary for the regeneration of the latter adsorber, without cracking the recovered products by such added heat.

7. In a process for the recovery of volatile products by solid adsorbents with regeneration by steam, the improvements consisting in providing a plurality of adsorbers into which the matter for treatment can be circulated, said adsorbers working at successively decreasing pressures, passing superheated steam through said adsorbers in series at the conclusion of an adsorption operation, re-superheating the steam leaving one adsorber before it enters the next, condensing the steam leaving the last adsorber, and separating the recovered products from the condensate.

8. In a process for the recovery of volatile products by solid adsorbents with regeneration by steam, the improvements consisting in providing a plurality of adsorbers into which the matter for treatment can be circulated said adsorbers working at successively decreasing pressures, passing superheated steam through said adsorbers at the conclusion of an adsorption operation, utilizing the latent heat of the steam leaving one adsorber and adding superheat thereto for the regeneration of the next adsorber, condensing the steam leaving the last adsorber, and separating the recovered products from the condensate.

In testimony whereof I hereunto affix my signature.

ALBERT GODEL.